United States Patent
Boulton

(10) Patent No.: US 8,451,270 B2
(45) Date of Patent: May 28, 2013

(54) REAL-TIME RADIOSITY SYSTEM IN A VIDEO GAME ENVIRONMENT

(75) Inventor: Michael Boulton, Twycross (GB)

(73) Assignee: Microsoft Corporation, Redmond, WA (US)

( * ) Notice: Subject to any disclaimer, the term of this patent is extended or adjusted under 35 U.S.C. 154(b) by 905 days.

(21) Appl. No.: 12/146,317

(22) Filed: Jun. 25, 2008

(65) Prior Publication Data

US 2009/0322750 A1  Dec. 31, 2009

(51) Int. Cl.
*G06T 15/20* (2011.01)

(52) U.S. Cl.
USPC ......................................................... 345/426

(58) Field of Classification Search
USPC ...................... 703/1; 345/582, 426
See application file for complete search history.

(56) References Cited

U.S. PATENT DOCUMENTS

| | | | |
|---|---|---|---|
| 5,313,568 A | 5/1994 | Wallace et al. | |
| 6,750,873 B1 * | 6/2004 | Bernardini et al. | 345/582 |
| 7,068,274 B2 | 6/2006 | Welch et al. | |
| 7,102,636 B2 | 9/2006 | Reshetov et al. | |
| 7,123,259 B2 | 10/2006 | Cabral et al. | |
| 7,205,999 B2 | 4/2007 | Leather | |
| 7,262,770 B2 | 8/2007 | Sloan et al. | |
| 2002/0169586 A1 * | 11/2002 | Rankin et al. | 703/1 |
| 2005/0270537 A1 * | 12/2005 | Mian et al. | 356/437 |
| 2006/0170677 A1 * | 8/2006 | Zhao et al. | 345/423 |
| 2007/0146360 A1 | 6/2007 | Clatworthy et al. | |
| 2007/0206008 A1 | 9/2007 | Kaufman et al. | |

FOREIGN PATENT DOCUMENTS

| | | |
|---|---|---|
| EP | 0580020 A3 | 6/1994 |
| EP | 0698259 B1 | 11/1996 |

OTHER PUBLICATIONS

Michael F. Cohen, A progressive refinement approach to fast radiosity image generation, Aug. 1988.*
Michael F. Cohen, The hemi-cube a radiosity solution for complex environment, 1985.*
Miro Lahdenmaki, A survey of real-time shading, 2004.*
Greg Coombe, Radiosity on graphics hardware, 2004.*
Seth Teller, Partition and ordering large radiosity computations, 1994.*
Greg Coombe, CPU Gems 2, Chapter 9, Global Illumination Using Progressive Refinement Radiosity, Publish 2005.*

(Continued)

*Primary Examiner* — Ke Xiao
*Assistant Examiner* — Kyle Zhai
(74) *Attorney, Agent, or Firm* — Mayer & Williams PC

(57) ABSTRACT

An approach for implementing an approximation of a radiosity solver that may be run entirely in the graphics processing unit of a video game console is provided. A set of raw triangles is partitioned into a collection of roughly planar transfer patches. For each patch, a projection on to the direct product is defined and mapped into the radiosity UV space. A transfer bundle set is constructed by sorting visible patches by flux contribution and storing a predetermined number of the greatest contributors in a texture. At runtime, real-time global illumination is implemented by rendering direct lighting into a texture of the same resolution as the transfer bundle set. The lighting is successively propagated in a number of passes using the transfer bundles. Each pass constitutes a single "bounce" and the per-bundle contribution of the first bounce is extracted and used for an indirect specular and diffuse bump-mapping response.

15 Claims, 7 Drawing Sheets

OTHER PUBLICATIONS

Edward Angel, Interfactive Computer graphics: A Top Down Approach Using OpenGL, 3rd edition, 2003.*
Wikipedia, Radiosity (3D computer graphics), 2007.*
Delingette et al. (Simplex Meshes: a General Representation for 3D shape reconstruction, 1994).*
Fan et al. (GPU Cluster for High Performance Computing, IEEE, 2004).*
Martinez, et al., "A Multiple Depth Buffer Implementation for Radiosity", ICCSA 2003, LNCS 2669, 2003, pp. 346-355.
Xiao, et al., "Dynamic Radiosity on Multi-resolution Models", ICAT 2006, LNCS 4282, 2006, pp. 753-763.
Andrew Willmott, "Wavelet Radiosity Operations", 2000, 12 Pages.

* cited by examiner

REAL-TIME RADIOSITY SYSTEM IN A VIDEO GAME ENVIRONMENT

BACKGROUND

Computer and video games have matured from the likes of "Pong" into epic adventures having rich storylines, photorealistic graphics, and complex interaction systems, thereby allowing players to immerse themselves in the alternative reality that is emulated by the video game. As used herein, video games may include, but are not limited to, any game played on a data processing device. Examples of video games may include computer games, game console games (e.g., playable on the Microsoft Xbox®, Sony PlayStation®, and/or Nintendo® 64 and Wii brand game consoles), coin-operated or token-operated arcade games, portable gaming device games (e.g., playable on the PlayStation Portable ("PSP"®), Nintendo Game Boy and DS™, mobile phones, smartphones, personal digital assistants, etc.), or other software-driven games that are played on personal computers ("PCs").

Real-time global illumination has long been a goal of the video game industry to enhance the quality of the gameplay by rendering more photorealistic images. Such images need to take lighting effects into account by simulating the underlying physical phenomena of light emission, propagation, and reflection to thus model the interaction of light between all objects in a video game scene. Particularly for indoor scenes where light cannot escape, the effects of inter-reflection of light among object surfaces, which can account for a significant portion of the total illumination in the scene, should be considered. A global illumination model is typically used to simulate the effects of inter-reflection by considering all objects as potential sources of illumination in the scene.

A radiosity algorithm that was originally developed to model radiant heat transfer has developed into a powerful simulation technique for providing realistic lighting for global illumination. Radiosity simulates many reflections of light around the scene and can produce effective lighting results for scenes comprising multiple diffuse reflecting surfaces. Images resulting from a solver that implements a radiosity algorithm are characterized by more accurate soft-shadowed regions, color bleeding among objects, subtle changes in brightness across objects like walls, and other realistic lighting effects. However, while producing realistic results, radiosity solvers are typically computationally intensive and can consume substantial resources on a video gaming system as compared to solutions using other techniques such as ray tracing. Accordingly, real-time radiosity solutions have traditionally been difficult to implement.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An approach for implementing an approximation of a radiosity solver that may be run entirely in the graphics processing unit ("GPU") of a video game console is provided to achieve high-quality, real-time global illumination. During a pre-processing, or building stage, a set of raw triangles which defines a world space in a video gaming environment is partitioned into a collection of roughly planar transfer patches. For each patch, a projection on to the direct product [0, 1] X [0, 1] is defined and mapped into the radiosity UV space. A transfer bundle set is constructed by sorting visible patches in the radiosity UV space by flux contribution and storing a predetermined number of the greatest contributors in a texture.

During a rendering stage at runtime on the GPU, real-time global illumination is implemented by rendering direct lighting into a texture of the same resolution as the transfer bundle set. The lighting is successively propagated using the transfer bundles in a number of passes in the radiosity UV space which closely approximates the radiosity propagation in world space. Each pass constitutes a single "bounce" and the per-bundle contribution of the first bounce is extracted and used for generating an indirect specular and diffuse bump-mapping response.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings. Elements are not drawn to scale unless otherwise indicated.

DETAILED DESCRIPTION

Figure 1:
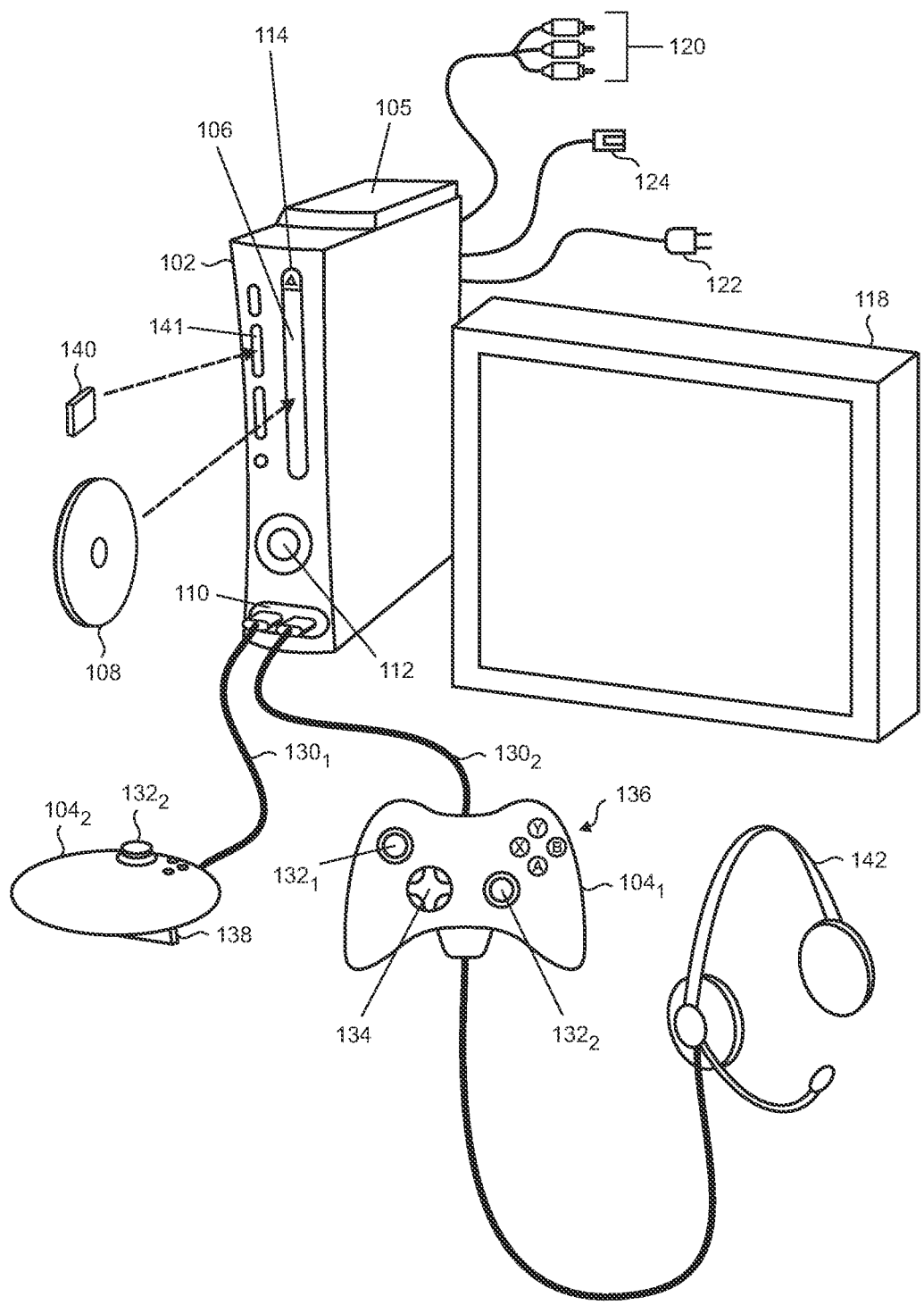
FIG. 1 shows an illustrative gaming system that may be used to implement one or more of the features of the arrangement described herein.

FIG. 1 illustrates an example of a gaming system 100 on which computer games, video games, and/or other electronic games (collectively referred to herein as video games) may be played. The gaming system 100 is only one example of a suitable gaming system and is not intended to suggest any limitation as to the scope of use or functionality of the features described herein. Neither should the gaming system 100 be interpreted as having any dependency or requirement relating to any one or combination of components illustrated in the illustrative operating gaming system 100.

Aspects described herein are operational with numerous other general purpose or special purpose computing system environments or configurations. Examples of well-known computing systems, environments, and/or configurations that may be suitable for use include, but are not limited to, PCs, server computers, portable and hand-held devices such as personal digital assistants ("PDAs"), mobile phones, smart phones, handheld game devices, tablet PCs or laptop PCs, media centers, multiprocessor systems, microprocessor-based systems, set-top boxes, programmable consumer electronics, network PCs, minicomputers, mainframe computers, electronic game consoles, distributed computing environments that include any of the above systems or devices, and the like.

Aspects herein may be described in the general context of computer-executable instructions, such as program modules, being executed by a computer. Generally, program modules include routines, programs, objects, components, data structures, etc., that perform particular tasks or implement particular abstract data types. The features described herein may also be practiced in distributed computing environments where tasks are performed by remote processing devices that are linked through a communications network. In a distributed computing environment, program modules may be located in both local and remote computer storage media including memory storage devices.

The gaming system 100 may include a game console 102 and multiple controllers, as represented by controllers $104_1$ and $104_2$. The game console 102 is equipped with a removably attachable hard disk drive 105 and a portable media drive 106 that supports various forms of portable storage media as represented by optical storage disc 108. Examples of suitable portable storage media include DVD (digital versatile disc), CD-ROM (compact disc—read only memory), game discs, and so forth.

Game console 102 has slots 110 on its front face to support up to two controllers, although the number and arrangement of slots may be modified. A power button 112 and an eject button 114 are also positioned on the front face of the game console 102. The power button 112 switches power to the game console and the eject button 114 alternately opens and closes a tray of the portable media drive 106 to allow insertion and extraction of the storage disc 108.

Game console 102 may connect to a television 118 or other display via A/V interfacing cables 120. A power cable 122 provides power to the game console. Game console 102 may further be configured with broadband network capabilities, as represented by the cable or modem connector 124 to facilitate access to a network, such as the Internet.

Each controller 104 may be coupled to the game console 102 via a wired or wireless interface. In the illustrated implementation, the controllers are USB (Universal Serial Bus) compatible and are connected to the console 102 via respective USB cables $130_1$ and $130_2$. The controllers 104 may be equipped with any of a wide variety of user interaction mechanisms. In this example, each controller 104 is equipped with two thumbsticks $132_1$ and $132_2$, a D-pad (directional pad) 134, buttons 136 (e.g., 'A', 'B', 'X', 'Y'), and two triggers 138 (although only one trigger is shown in the drawing). These mechanisms are merely representative, and other known gaming mechanisms may be substituted for or added to those shown in FIG. 1.

A memory unit 140 may be inserted into a memory unit reader 141 in the game console 102 to provide additional and portable storage. In this example, up to two memory units may be supported by the game console 102. Portable memory units enable users to store game parameters and user accounts, and port them for play on other consoles. A headset 142 may be connected to the controller 104 or game console 102 to provide audio communication capabilities. Headset 142 may include a microphone for audio input and one or more speakers for audio output.

Gaming system 100 is capable of playing, for example, games, music, and videos. With the different storage offerings, titles can be played from the hard disk drive or the portable media 108 in drive 106, from an online source, or from a memory unit 140. For security, in some embodiments executable code can only be run from the portable media 108.

A sample of what gaming system 100 is capable of playing includes game titles played from CD and DVD discs, from the hard disk drive, or from an online source, digital music played from a CD in the portable media drive 106, from a file on the hard disk drive (e.g., Windows Media Audio ("WMA") format), or from online streaming sources, and digital audio/video played from a DVD disc in the portable media drive 106, from a file on the hard disk drive (e.g., Active Streaming Format), or from online streaming sources.

Figure 2:
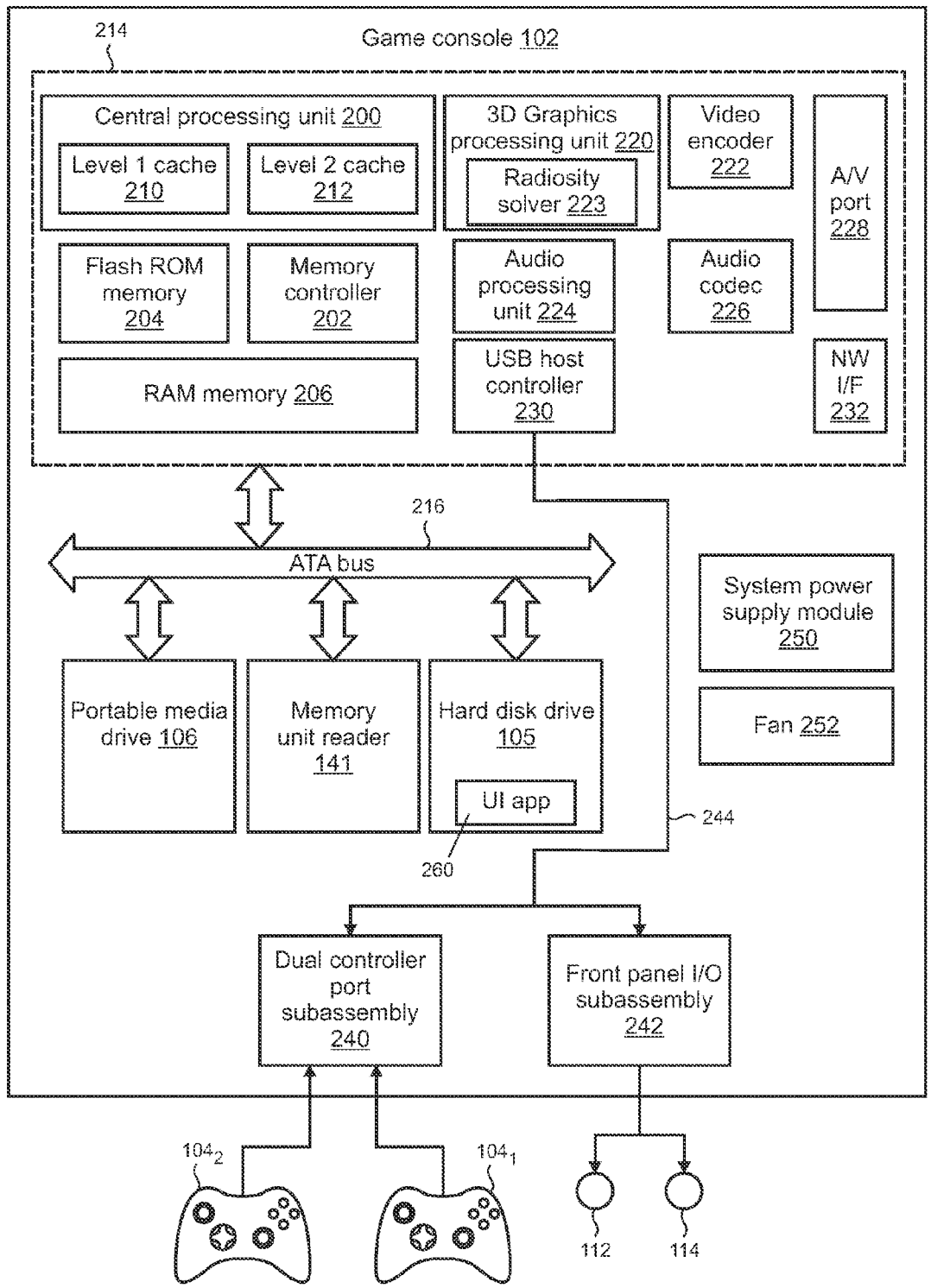
FIG. 2 shows a functional block diagram of the gaming system shown in FIG. 1.

FIG. 2 shows functional components of the gaming system 100 in more detail. The game console 102 has a central processing unit ("CPU") 200 and a memory controller 202 that facilitates processor access to various types of memory, including a flash ROM (Read Only Memory) 204, a RAM (Random Access Memory) 206, the hard disk drive 105, the memory unit reader 141, and the portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture ("ISA") bus, a Micro Channel Architecture ("MCA") bus, an Enhanced ISA ("EISA") bus, a Video Electronics Standards Association ("VESA") local bus, and a Peripheral Component Interconnects ("PCI") bus also known as a Mezzanine bus.

As one suitable implementation, the CPU 200, memory controller 202, ROM 204, and RAM 206 are integrated on to a common module 214. In this implementation, ROM 204 is configured as a flash ROM that is connected to the memory controller 202 and a ROM bus (not shown). RAM 206 is configured as multiple DDR SDRAM (Double Data Rate Synchronous Dynamic RAM) that is independently controlled by the memory controller 202 via separate buses (not shown). The hard disk drive 105 and portable media drive 106 are connected to the memory controller via the PCI bus and an ATA (Advanced Technology Attachment) bus 216.

A 3D GPU 220 and a video encoder 222 form a video processing pipeline for high speed and high resolution graphics processing. As described below in the description accompanying FIGS. 5-7, a radiosity solver 223 is provided that can run entirely on the GPU 220.

Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an A/V (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers $104_1$ and $104_2$. The network interface 232 provides access to a network (e.g., Internet, home network, etc.) and may be any of a wide variety of various wired or wireless interface components including an Ethernet card, a modem, a Bluetooth module, a cable modem, and the like.

The game console 102 has a dual controller port subassembly 240 which supports the game controllers $104_1$ and $104_2$. A front panel I/O subassembly 242 supports the functionality of the power button 112 and the eject button 114, as well as any LEDs (light emitting diodes) or other indicators exposed on the outer surface of the game console. The subassemblies 240 and 242 are coupled to the module 214 via one or more cable assemblies 244.

A system power supply module 250 provides power to the components of the gaming system 100. A fan 252 cools the circuitry within the game console 102.

The game console 102 implements a uniform media portal model that provides a consistent user interface and navigation hierarchy to move users through various entertainment areas. The portal model offers a convenient way to access content from multiple different media types—game data, audio data, and video data—regardless of the media type inserted into the portable media drive 106.

To implement the uniform media portal model, a console user interface ("UI") application 260 is stored on the hard disk drive 105. When the game console is powered on, various portions of the console application 260 are loaded into RAM 206 and/or caches 210 and 212 and executed on the CPU 200. The console application 260 presents a graphical user interface that provides a consistent user experience when navigating to different media types available on the game console.

The gaming system 100 may be operated as a standalone system by simply connecting the system to a television or other display. In this standalone mode, the gaming system 100 allows one or more players to play games, watch movies, or listen to music. However, with the integration of broadband connectivity made available through the network interface 232, the gaming system 100 may further be operated as a participant in a larger network gaming community. This network gaming environment is described next.

Figure 3:
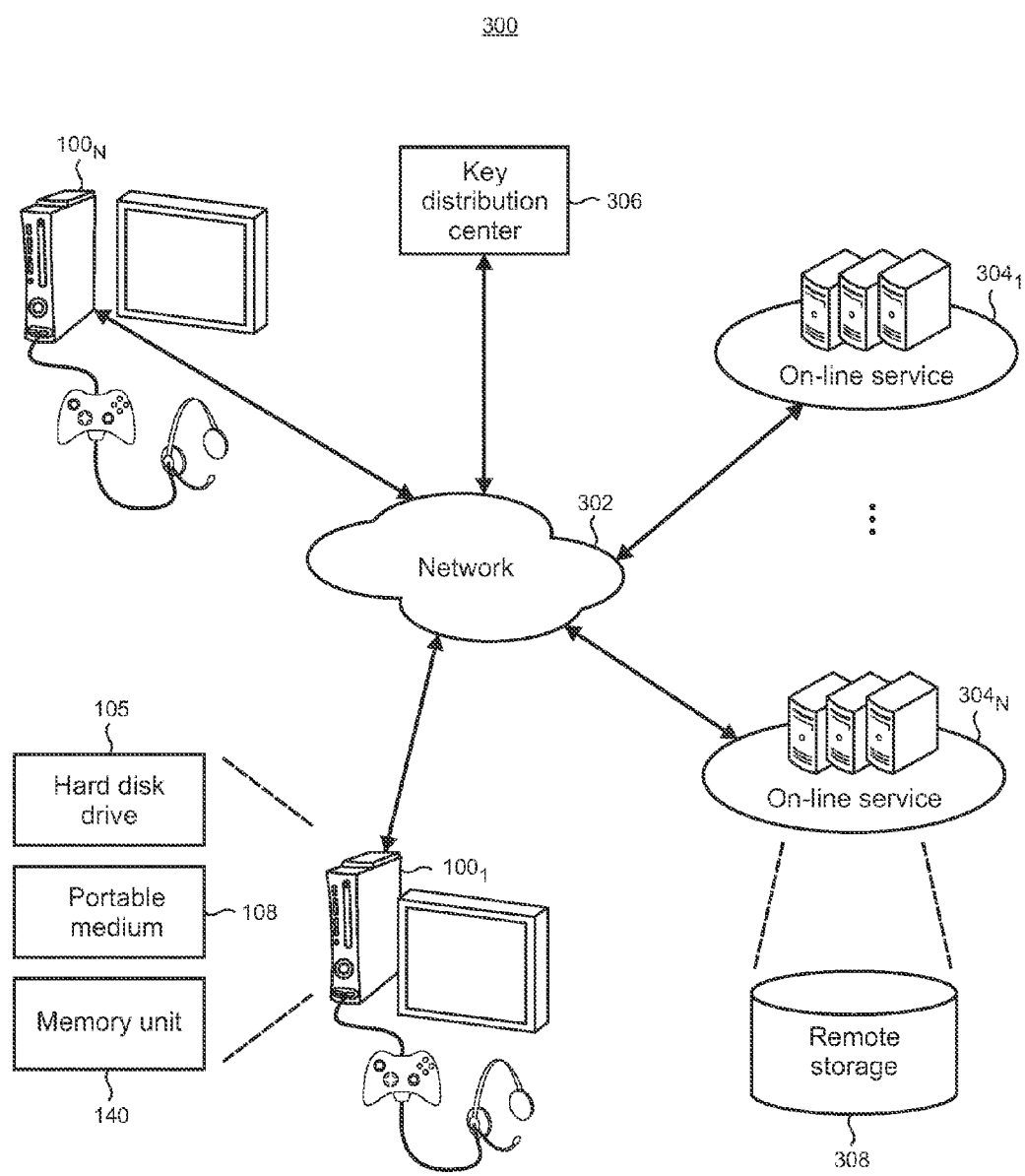
FIG. 3 shows a functional block diagram of an illustrative networked gaming system.

FIG. 3 shows an exemplary network gaming environment 300 that interconnects multiple gaming systems $100_{1...N}$ via a network 302. The network 302 represents any of a wide variety of data communications networks. It may include public portions (e.g., the Internet) as well as private portions (e.g., a residential Local Area Network ("LAN")), as well as combinations of public and private portions. Network 302 may be implemented using any one or more of a wide variety of conventional communications media including both wired and wireless media. Any of a wide variety of communications protocols can be used to communicate data via network 302, including both public and proprietary protocols. Examples of such protocols include TCP/IP (Transport Control Protocol/Internet Protocol), IPX/SPX (Internetwork Packet Exchange/Sequenced Packet Exchange), NetBEUI (NetBIOS Extended User Interface where BIOS stands for Basic Input/Output System), etc.

In addition to gaming systems 100, one or more online services $304_{1...N}$ may be accessible via the network 302 to provide various services for the participants, such as hosting online games, serving downloadable music or video files, hosting gaming competitions, serving streaming audio/video files, and the like. The network gaming environment 300 may further involve a key distribution center 306 that plays a role in authenticating individual players and/or gaming systems 100 to one another as well as online services 304. The distribution center 306 distributes keys and service tickets to valid participants that may then be used to form games amongst multiple players or to purchase services from the online services 304.

The network gaming environment 300 introduces another memory source available to individual gaming systems 100, namely online storage. In addition to the portable media 108, the hard disk drive 105, and the memory unit(s) 140, the gaming systems 100 can also access data files available at remote storage locations via the network 302, as exemplified by remote storage 308 at online service $304_N$.

Figure 4:
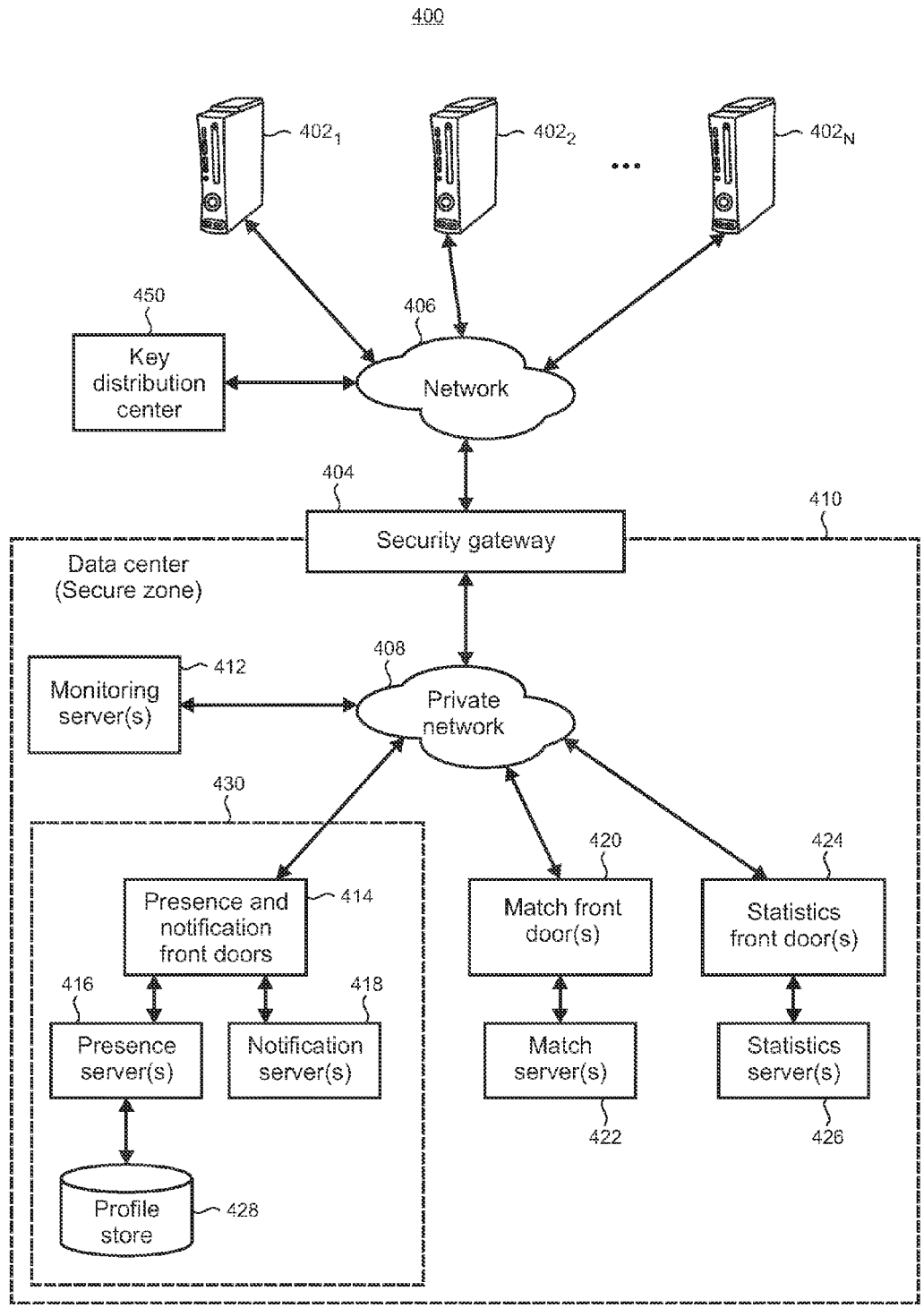
FIG. 4 shows a functional block diagram of an illustrative on-line gaming environment.

FIG. 4 is a block diagram of another illustrative online gaming environment 400, e.g. XBOX® 360 by Microsoft Corporation. Multiple game consoles $402_{1, 2...N}$ are coupled to a security gateway 404 via a network 406. Each game console 402 can be configured in a similar manner as game console 102 of FIG. 1 or FIG. 2, for example. Network 406 represents any one or more of a variety of conventional data communications networks. Network 406 will typically include packet switched networks, but may also include circuit switched networks. Network 406 can include wired and/or wireless portions. In one exemplary implementation, network 406 includes the Internet and may optionally include one or more local area networks and/or wide area networks ("WANs"). At least a part of network 406 is a public network, which refers to a network that is publicly-accessible.

In some situations, network 406 includes a LAN (e.g., a home network), with a routing device situated between game console 402 and security gateway 404. This routing device may perform network address translation ("NAT"), allowing the multiple devices on the LAN to share the same IP address on the Internet, and to operate as a firewall to protect the device(s) on the LAN from access by malicious or mischievous users via the Internet.

Security gateway 404 operates as a gateway between public network 406 and a private network 408. Private network 408 can be any of a wide variety of conventional networks, such as a local area network. Private network 408, as well as other devices discussed in more detail below, is within a data center 410 that operates as a secure zone. Data center 410 is made up of trusted devices that communicate using trusted communications. Thus, encryption and authentication within secure zone 410 is not necessary. The private nature of network 408 refers to the restricted accessibility of network 408 such that access to network 408 is limited to only certain individuals (e.g., restricted by the owner or operator of data center 410).

Security gateway 404 is a cluster of one or more security gateway computing devices. These security gateway computing devices collectively implement security gateway 404. Security gateway 404 may optionally include one or more conventional load balancing devices that operate to direct requests to be handled by the security gateway computing devices to appropriate ones of those computing devices. This directing or load balancing is performed in a manner that attempts to balance the load on the various security gateway computing devices approximately equally (or alternatively in accordance with some other criteria).

Also within data center 410 are: one or more monitoring servers 412, one or more presence and notification front doors 414, one or more presence servers 416, one or more notification servers 418, and a profile store 428 (collectively implementing a presence and notification service or system 430), one or more match front doors 420 and one or more match servers 422 (collectively implementing a match service), and one or more statistics front doors 424 and one or more statistics servers 426 (collectively implementing a statistics service). The servers 416, 418, 422, and 426 provide services to game consoles 402, and thus can be referred to as service devices. Other service devices may also be included in addition to, and/or in place of, one or more of the servers 416, 418, 422, and 426. Additionally, although only one data center is shown in FIG. 4, alternatively, multiple data centers may exist with which game consoles 402 can communicate. These data centers may operate independently, or alternatively may operate collectively (e.g., to make one large data center available to the game consoles 102 and 402).

Game consoles 402 are situated remotely from data center 410, and may access data center 410 via network 406. A game console 402 desiring to communicate with one or more devices in the data center logs in to the data center and establishes a secure communication channel between the game console 402 and security gateway 404. Game console 402 and security gateway 404 encrypt and authenticate data packets being passed back and forth, thereby allowing the data packets to be securely transmitted between them without being understood by any other device that may capture or copy the data packets without breaking the encryption. Each data packet communicated from game console 402 to security gateway 404, or from security gateway 404 to game console 402, can have data embedded therein. This embedded data is referred to as the content or data content of the packet. Additional information may also be inherently included in the packet based on the packet type (e.g., a heartbeat packet).

The secure communication channel between a game console 402 and security gateway 404 is based on a security ticket. Game console 402 authenticates itself and the current user(s) of console 402 to a key distribution center 450 and obtains, from key distribution center 450, a security ticket. Game console 402 then uses this security ticket to establish the secure communication channel with security gateway 404. In establishing the secure communication channel with security gateway 404, the game console 402 and security gateway 404 authenticate themselves to one another and establish a session security key that is known only to that particular game console 402 and the security gateway 404. This session security key is used to encrypt data transferred between the game console 402 and the security gateway 404, so no other devices (including other game consoles 402) can read the data. The session security key is also used to authenticate a data packet as being from the security gateway 404 or game console 402 that the data packet alleges to be from. Thus, using such session security keys, secure communication channels can be established between the security gateway 404 and the various game consoles 402.

Once the secure communication channel is established between a game console 402 and the security gateway 404, encrypted data packets can be securely transmitted between the two. When the game console 402 desires to send data to a particular service device in data center 410, the game console 402 encrypts the data and sends it to security gateway 404 requesting that it be forwarded to the particular service device(s) targeted by the data packet. Security gateway 404 receives the data packet and, after authenticating and decrypting the data packet, encapsulates the data content of the packet into another message to be sent to the appropriate service via private network 408. Security gateway 404 determines the appropriate service for the message based on the requested service(s) targeted by the data packet.

Similarly, when a service device in data center 410 desires to communicate data to a game console 402, the data center sends a message to security gateway 404, via private network 408, including the data content to be sent to the game console 402 as well as an indication of the particular game console 402 to which the data content is to be sent. Security gateway 404 embeds the data content into a data packet, and then encrypts the data packet so it can only be decrypted by the particular game console 402 and also authenticates the data packet as being from the security gateway 404.

Although discussed herein as primarily communicating encrypted data packets between security gateway 404 and a game console 402, alternatively some data packets may be partially encrypted (some portions of the data packets are encrypted while other portions are not encrypted). Which portions of the data packets are encrypted and which are not can vary based on the desires of the designers of data center 410 and/or game consoles 402. For example, the designers may choose to allow voice data to be communicated among consoles 402 so that users of the consoles 402 can talk to one another—the designers may further choose to allow the voice data to be unencrypted while any other data in the packets is encrypted. Additionally, in another alternative, some data packets may have no portions that are encrypted (that is, the entire data packet is unencrypted). It is also noted that, even if a data packet is unencrypted or only partially encrypted, all of the data packet can still be authenticated.

Each security gateway device in security gateway 404 is responsible for the secure communication channel with typically one or more game consoles 402, and thus each security gateway device can be viewed as being responsible for managing or handling one or more game consoles. The various security gateway devices may be in communication with each other and communicate messages to one another. For example, a security gateway device that needs to send a data packet to a game console that it is not responsible for managing may send a message to all the other security gateway devices with the data to be sent to that game console. This message is received by the security gateway device that is responsible for managing that game console and sends the appropriate data to that game console. Alternatively, the security gateway devices may be aware of which game consoles are being handled by which security gateway devices—this awareness may be explicit, such as each security gateway device maintaining a table of game consoles handled by the other security gateway devices, or alternatively, implicit, such as determining which security gateway device is responsible for a particular game console based on an identifier of the game console.

Monitoring server(s) 412 operate to inform devices in data center 410 of an unavailable game console 402 or an unavailable security gateway device of security gateway 404. Game consoles 402 can become unavailable for a variety of different reasons, such as a hardware or software failure, the console being powered-down without logging out of data center 410, the network connection cable to console 402 being disconnected from console 402, other network problems (e.g., the LAN that the console 402 is on malfunctioning), etc. Similarly, a security gateway device of security gateway 404 can become unavailable for a variety of different reasons, such as hardware or software failure, the device being powered-down, the network connection cable to the device being disconnected from the device, other network problems, etc.

Each of the security gateway devices in security gateway 404 is monitored by one or more monitoring servers 412, which detect when one of the security gateway devices becomes unavailable. In the event a security gateway device becomes unavailable, monitoring server 412 sends a message to each of the other devices in data center 410 (servers, front doors, etc.) that the security gateway device is no longer available. Each of the other devices can operate based on this information as it sees fit (e.g., it may assume that particular game consoles being managed by the security gateway device are no longer in communication with data center 410 and perform various clean-up operations accordingly). Alternatively, only certain devices may receive such a message from the monitoring server 412 (e.g., only those devices that are concerned with whether security gateway devices are available).

Security gateway 404 monitors the individual game consoles 402 and detects when one of the game consoles 402 becomes unavailable. When security gateway 404 detects that a game console is no longer available, security gateway 404 sends a message to monitoring server 412 identifying the unavailable game console. In response, monitoring server 412 sends a message to each of the other devices in data center 410 (or alternatively only selected devices) that the game console is no longer available. Each of the other devices can then operate based on this information as it sees fit.

Presence server(s) 416 holds and processes data concerning the status or presence of a given user logged in to data center 410 for online gaming. Notification server(s) 418 maintains multiple notification queues of outgoing messages destined for a player logged in to data center 410. Presence and notification front door 414 is one or more server devices that operate as an intermediary between security gateway 404 and servers 416 and 418. One or more load balancing devices (not shown) may be included in presence and notification front door 414 to balance the load among the multiple server devices operating as front door 414.

Security gateway 404 communicates messages for servers 416 and 418 to the front door 414, and the front door 414 identifies to which particular presence server 416 or particular notification server 418 the message is to be communicated. By using front door 414, the actual implementation of servers 416 and 418, such as which servers are responsible for managing data regarding which users, is abstracted from security gateway 404. Security gateway 404 can simply forward messages that target the presence and notification service to presence and notification front door 414 and rely on front door 414 to route the messages to the appropriate one of server(s) 416 and server(s) 418.

Match server(s) 422 holds and processes data concerning the matching of online players to one another. An online user is able to advertise a game available for play along with various characteristics of the game (e.g., the location where a football game will be played, whether a game is to be played during the day or at night, the user's skill level, etc.). These various characteristics can then be used as a basis to match up different online users to play games together. Match front door 420 includes one or more server devices (and optionally a load balancing device(s)) and operates to abstract match server(s) 422 from security gateway 404 in a manner analogous to front door 414 abstracting server(s) 416 and server(s) 418.

Statistics server(s) 426 holds and processes data concerning various statistics for online games. The specific statistics used can vary based on the game designer's desires (e.g., the top ten scores or times, a world ranking for all online players of the game, a list of users who have found the most items or spent the most time playing, etc.). Statistics front door 424 includes one or more server devices (and optionally a load balancing device(s)) and operates to abstract statistics server(s) 426 from security gateway 404 in a manner analogous to front door 414 abstracting server(s) 416 and server(s) 418.

Thus, it can be seen that security gateway 404 operates to shield devices in the secure zone of data center 410 from the untrusted public network 406. Communications within the secure zone of data center 410 need not be encrypted, as all devices within data center 410 are trusted. However, any information to be communicated from a device within data center 410 to a game console 402 passes through security gateway cluster 404, where it is encrypted in such a manner that it can be decrypted by only the game console 402 targeted by the information.

One or more features described herein may be embodied in computer-executable instructions (i.e., software) stored in RAM 206, non-volatile memory 108, 105, 308, or any other resident memory on game console 102. Generally, software modules include routines, programs, objects, components, data structures, etc. that perform particular tasks or implement particular abstract data types when executed by a processor in a computer or other device. The computer executable instructions may be stored on a computer readable medium such as one or more hard disks 105, portable storage media 108 (e.g., CD-ROM, DVD, disk, etc.), solid state memory, RAM 206, etc. As will be appreciated by one of skill in the art, the functionality of the software modules may be combined or distributed as desired in various embodiments. In addition, the functionality may be embodied in whole or in part in firmware or hardware equivalents such as application specific integrated circuits ("ASIC"), field programmable gate arrays ("FPGA"), and the like.

Turning now to the present real-time radiosity system for implementing high-quality, real-time global illumination, a radiosity solver 223 is provided that may be run entirely in the GPU 220 shown in FIG. 2. The radiosity solver uses methods associated with a building stage (i.e., a pre-processing stage) and a rendering stage that is implemented during runtime of a video game that uses the present radiosity system.

Figure 5:
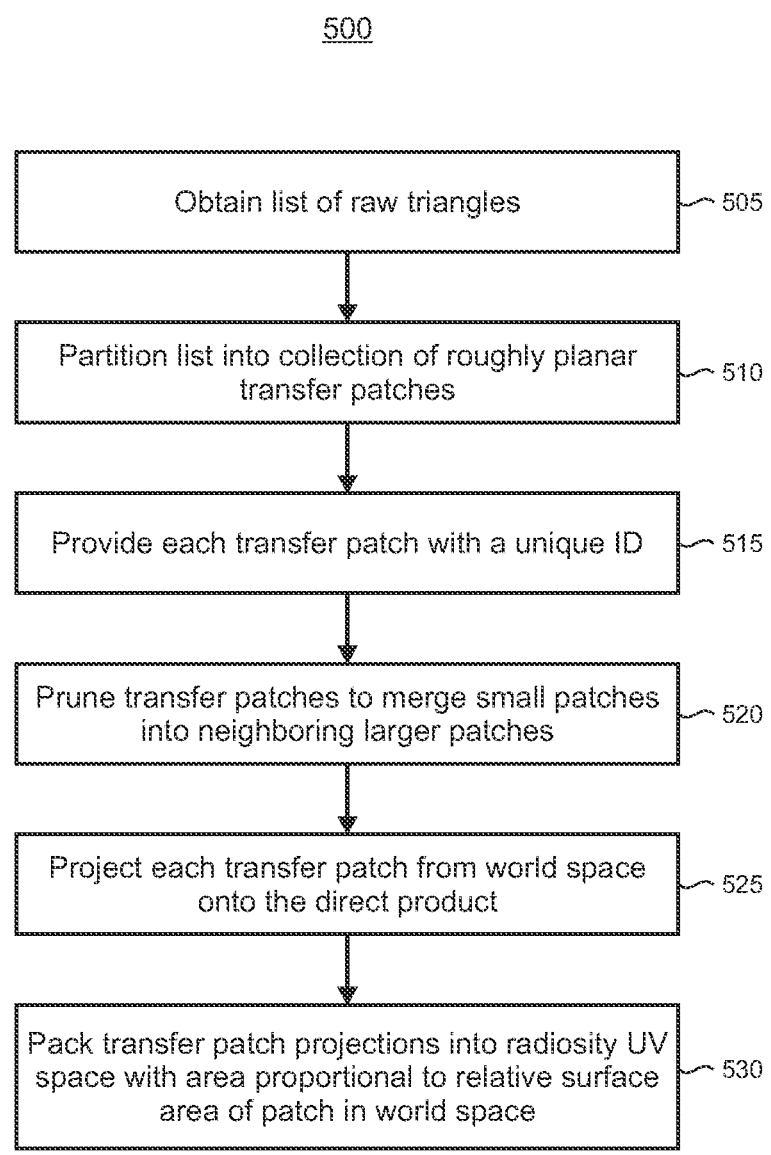
FIG. 5 is a flowchart of an illustrative method for constructing transfer patches used in the present real-time radiosity system.

FIG. 5 is a flowchart of an illustrative method 500 for constructing transfer patches in a building stage. A list of raw triangles is obtained (505) that defines a world space in the video game environment 100 supported by the console 102 shown in FIGS. 1-4 and described in the accompanying text. The world space is essentially the game world and provides a coordinate system with which objects in the world space are positioned and computations for animations, movements, collisions, etc., are performed.

The list of triangles is partitioned in a collection of roughly planar transfer patches (510), and each transfer patch is given a unique identifier (515). The partitioning is performed by choosing an unallocated triangle and recursively traversing all connected triangles attached to it. A traversed triangle is added to the transfer patch if it does not cause the patch to exceed a certain curvature. A threshold for the curvature may be specified to meet the needs of a particular implementation. Typically, the greater the allowed curvature, the larger the transfer patch is likely to be, at the expense of some simulation accuracy.

After the collection of transfer patches is constructed, pruning is performed to merge small patches to neighboring larger patches (520). Generally, the goal is to have transfer patches as large and as few as possible, because this results in a more accurate and efficient simulation.

Each transfer patch (consisting of a collection of connected triangles) is then projected from the world space on to the direct product [0, 1] X [0, 1] using a 2-D (i.e., "two-dimension") UV coordinate system (525). This is performed by first projecting all the triangles on to the plane formed by the patch average normal, and second by tightly bounding the planar projection with a 2-D-oriented bounding box in the plane. For transfer patches with higher allowed curvature, it may also be useful to attempt to iteratively refine the generated UV coordinates to preserve valence (i.e., incident edges) of the transfer patches, and second to maintain relative area ratios (i.e., so for two triangles A and B in the transfer patch, the ratio of surface areas in world space is close to the ratio of projected UV surface areas in the direct product [0, 1] X [0, 1]).

The transfer patch projections (i.e., the transfer patch UVs) are then packed into a single UV set having an area proportional to the relative surface area of the transfer patch in world space (530). This is performed by splitting the UV set into square sub-regions, and allocating a rectangular subset of the sub-regions to each transfer patch. The size of such rectangular subset is chosen to reflect the surface area in world space occupied by the corresponding transfer patch. Thus, if transfer patch A has four times the surface area in world space than patch B, it would also have four times the surface area of patch B in the UV set. This means that texture elements (i.e., "texels") across different transfer patches are always of a similar size, which may help eliminate distortion across patches. In addition, it will be generally desirable that the texels are as square as possible in world space, and to allow a two texel gap between adjacent allocated blocks to enable correct linear filtering.

The completion of method 500 results in the generation of a list of transfer patches and a one-to-one UV parameterization.

Figure 6:
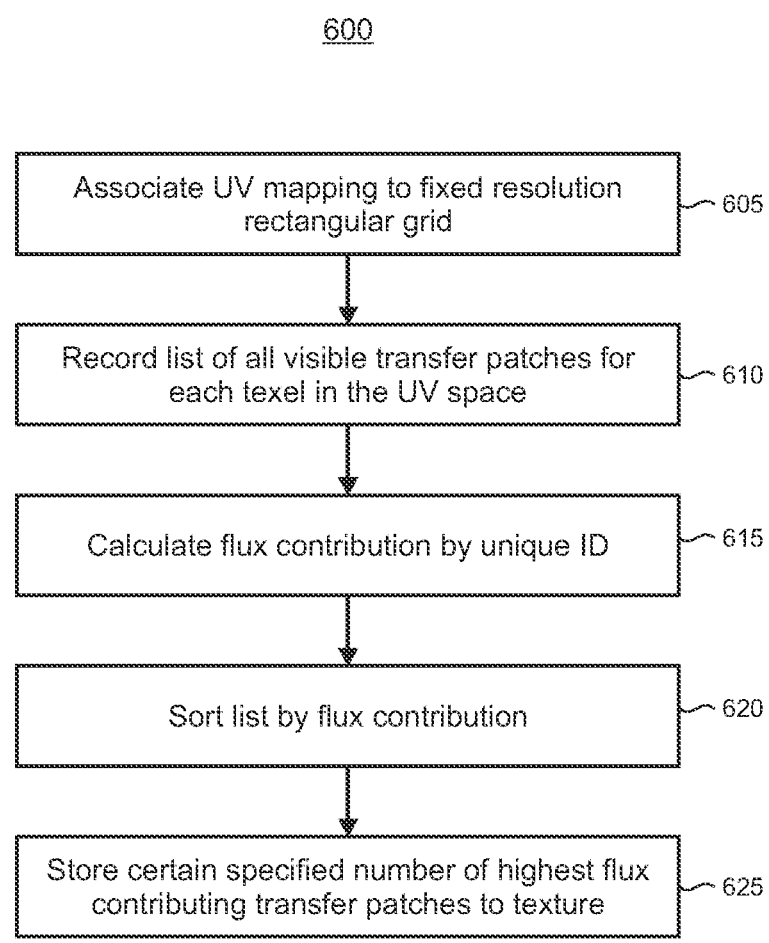
FIG. 6 is a flowchart of an illustrative method for constructing transfer bundles used in the present real-time radiosity system.

FIG. 6 is a flow chart of an illustrative method 600 for constructing transfer bundles from the transfer patches in the building stage. From the results of the transfer patch generation, the UV mapping is then associated with a rectangular grid with fixed resolution (605). The center of each element in the grid will represent a texel within the associated textures. If the resolution is increased, higher frequency lighting variants may be captured at the expense of greater storage requirements. In addition, the building stage can be expected to take longer.

A list of all visible transfer patches for each texel in the UV space is then recorded (610). Each grid element that corresponds to a mapped sub-region of a transfer patch is then traversed, and a Z-buffered cube map centered in this sub-region in world space is rendered. Each texel of the cube map records the nearest collision along a corresponding ray, if one exists. If a collision exists, since all of the geometry has been patched, it may be concluded that the ray must have collided with a transfer patch. The unique ID of this transfer patch is then recorded into the cube map texel, along with the cosine-weighted projected area with which this transfer patch subtends. The UV coordinates of the collision are also recorded, together with the base 2 logarithm of the world space length of the collision chord.

If the same unique ID is referenced within the cube map by two or more sufficiently disjoint islands of texels, each disjoint island may be provided with a unique sub index to enable them to be distinguished at a later point. For example, this may be performed using a standard clustering algorithm such as K-means. It may be desirable to distinguish the disjoint islands later because, from a perspective of the texel, the islands form separate sources and areas in between the islands will not contribute any light.

The total cosine-weighted flux contribution is then calculated per unique ID (and sub index ID where appropriate) (615) by traversing the rendered cube map using a binning algorithm. The list of unique IDs is then sorted by cosine-weighted flux contribution with an emission bias (620). If a transfer patch is naturally emissive, its importance is biased to give it higher rank in the sorted list and make it more likely to be selected for a transfer bundle.

A predetermined number of the greatest flux contributors are then stored into a texture (625). Either a fixed number or a variable number based on a specified threshold energy cutoff may be utilized. The advantage of the latter method is that it would naturally focus work and memory resources on areas of highlighting variance, thus achieving a higher level of GPU efficiency. For example, a new indirection texture would be built to point into a large line texture at the start of the transfer bundle list for that particular transfer patch which would also indicate the number of transfer bundles.

The completion of method 600 results in a transfer bundle texture set.

Figure 7:
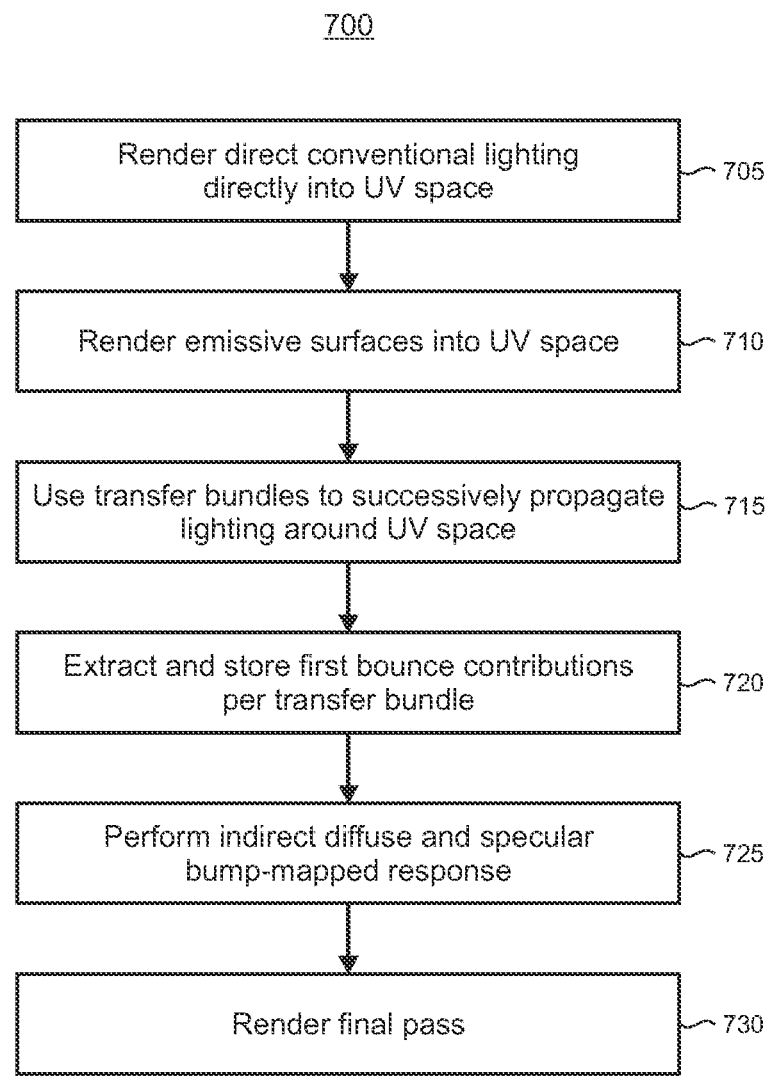
FIG. 7 is a flowchart of an illustrative method for performing global illumination using real-time radiosity at runtime.

FIG. 7 is a flowchart of an illustrative method 700 for performing global illumination using real-time radiosity during runtime of a video game. To perform real-time radiosity, direct conventional and, optionally, direct shadowed lighting (e.g., from point light sources) is rendered directly into the UV space with a texture of the same resolution as the transfer bundled texture set (705). Emissive surfaces are also rendered into the UV space (710). The transfer bundled textures created by the above-described method are then used to successively propagate the lighting around the UV space (715) using a plurality of passes which approximately corresponds to radiosity propagation in the world space. Each pass produces a new texture and uses the results from the previous pass only. Propagation is performed by fetching from the preceding texture at a MIP mapping level that corresponds to the base 2 logarithm stored in the transfer bundle. This has the effect of summing over a square in lighting space whose size closely approximates the area subtended by the transfer patch region.

Each pass constitutes a single bounce. The flux contribution from each transfer bundle is extracted for the first bounce and stored separately (720). The stored information is used to perform an indirect diffuse and specular bump-mapped response (725).

The final pass is then rendered (730) where the direct lighting is recalculated and the first and second radiosity textures are discarded. Subsequent bounces are then summed and added to a bump-mapped specular and diffuse response which is generated using the individual first-bounce flux contributions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for constructing transfer patches used for global illumination in a 3-D graphics environment, the method comprising the steps of:

partitioning a list of raw triangles which describe objects in a world space into roughly planar transfer patches, each transfer patch having an associated texel and the partitioning being performed in a first step of a pre-processing stage of a radiosity solver implemented in a hardware-based graphics processing unit disposed in a computing platform supporting an application executable in the 3-D graphics environment, the pre-processing being performed to enable real-time radiosity during runtime of the application, the partitioning further comprising i) adding a triangle to a transfer patch only if the adding does not cause the transfer patch to exceed a threshold curvature, and ii) if the threshold curvature is exceeded, then iteratively refining UV values resulting from application of subsequent steps in the pre-processing stage;

generating, in a second step of the pre-processing stage, a projection for each transfer patch from world space into a direct product, the direct product being a closed interval of all real numbers including 0 and 1; and packing, in a third step of the pre-processing stage, the direct product projection into a UV space with an area proportional to a relative surface area of the transfer patch in world space so that texels across different transfer patches are of substantially similar size, the packing further being performed so that each transfer patch is mapped to the UV space on a one-to-one basis with a regular grid at a fixed resolution and the iterative refinement in the partitioning step further being performed in a manner to preserve valence of incident edges of the raw triangles and to maintain relative ratios between surface areas in the world space and projected surface areas in the UV space.

2. The method of claim 1 including a further step of pruning transfer patches to merge small transfer patches with large transfer patches.

3. The method of claim 1 including a further step of providing each transfer patch with a unique ID.

4. The method of claim 1 in which the partitioning is performed by selecting an unallocated triangle and recursively traversing all triangles that are connected to the unallocated triangle.

5. The method of claim 1 in which the generating includes projecting the triangles on to a plane formed by a transfer patch average normal, and further bounding a planar projection with a 2-D-oriented bounding box in the plane.

6. The method of claim 1 in which the packing comprises splitting a UV set within the UV space into square sub-regions and allocating a rectangular subset of the sub-regions to each transfer patch.

7. A method for constructing transfer bundles in a UV set used for global illumination in a 3-D graphics environment, the method comprising the steps of:

associating UV mapping from the UV set to a regular grid of fixed resolution, the associating being performed in a first step of a pre-processing stage of a radiosity solver implemented in a hardware-based graphics processing unit disposed in a computing platform supporting an application executable in the 3-D graphics environment, the pre-processing being performed to enable real-time radiosity during runtime of the application;

for each texel in the UV set, recording, as a second step in the pre-processing stage, a list of visible transfer patches, each entry in the list being given a unique identifier, the visible transfer patches being determined by traversing each element in the regular fixed resolution grid that corresponds to a mapped sub-region of a transfer patch and rendering a Z-buffered cube map centered on the sub-region in a world space, in which each texel in the Z-buffered cube map provides a record of a nearest collision between a given transfer patch and a corresponding ray when such nearest collision exists, the record including the unique identifier of the given transfer patch, UV coordinates of the collision, and a length of a collision chord in the world space;

sorting, as a third step in the pre-processing stage, the list by flux contribution;

storing, as a fourth step in the pre-processing stage, a specified number of highest flux contributing transfer patches into a texture, the specified number of highest flux contributing transfer patches being variable based upon a threshold energy cutoff; and, generating, as a fifth step in the pre-processing stage, an indirection texture to indicate the specified number of stored highest flux contributing transfer patches, the indirection texture being included as a starting entry of the visible transfer patch list.

8. The method of claim 7 in which the flux contributing transfer patches are cosine-weighted.

9. The method of claim 7 including a further step of biasing emissive surfaces within the sorted list by flux contribution.

10. The method of claim 7 including a further step of distinguishing disjoint islands of texels that reference the same unique ID within the Z-buffered cube map using a unique sub index ID.

11. A method for rendering lighting using a global illumination model in a 3-D graphics environment, the method comprising the steps of:

rendering direct conventional lighting into a radiosity UV space, the rendering being performed using a hardware-based graphics processing unit that includes a radiosity solver; and using a set of transfer bundle textures to perform a real-time radiosity approximation by the radiosity solver during runtime of an application executing in the 3-D graphics environment by successively propagating the lighting using the set of transfer bundle textures in a series of passes in which each pass constitutes a single bounce, the set of transfer bundle textures including an indirection texture and being pre-constructed by sorting visible transfer patches in the visible UV space by flux contribution and storing a variable number of the highest flux contributing transfer patches in a texture, the variable number of stored highest flux contributing transfer patches being indicated by the indirection texture, the transfer patches being pre-constructed by partitioning raw triangles in a world space into roughly planar transfer patches which are projected on to a direct product and mapped into the radiosity UV space, the direct product being a closed interval of all real numbers including 0 and 1, the mapping of the transfer patches to the radiosity UV space being performed on a one-to-one basis at a fixed resolution and the partitioning including iteratively refining resulting UV values in a manner to preserve valence of incident edges of the raw triangles and to maintain relative ratios between surface areas in the world space and projected surface areas in the radiosity UV space; and extracting and storing a first bounce flux contribution per transfer bundle.

12. The method of claim 11 including the further steps of rendering emissive surfaces and rendering shadowed lighting into the radiosity UV space.

13. The method of claim 11 including a further step of discarding first and second radiosity textures and summing subsequent bounces for addition to a bump-mapped specular and indirect diffuse response.

14. The method of claim 11 in which the propagating is performed by fetching a MIP map level from a proceeding texture which corresponds to propagation in the world space.

15. The method of claim 11 in which the rendering is performed at a resolution that matches a resolution of the set of transfer bundle texture.

* * * * *